(12) United States Patent
Husistein

(10) Patent No.: US 7,337,688 B2
(45) Date of Patent: Mar. 4, 2008

(54) TWO-PART, LOW-BACKLASH SPINDLE NUT

(75) Inventor: Kurt Husistein, Schweiz (CH)

(73) Assignee: Eichenberger Gewinde AG, Burg/AG (CH)

( * ) Notice: Subject to any disclaimer, the term of this patent is extended or adjusted under 35 U.S.C. 154(b) by 0 days.

(21) Appl. No.: 11/203,989

(22) Filed: Aug. 16, 2005

(65) Prior Publication Data

US 2006/0037421 A1 Feb. 23, 2006

(30) Foreign Application Priority Data

Aug. 17, 2004 (CH) .................. 01354/04

(51) Int. Cl.
*F16H 3/06* (2006.01)
*F16H 29/02* (2006.01)
*F16H 27/02* (2006.01)
*F16H 29/20* (2006.01)
*F16H 55/18* (2006.01)

(52) U.S. Cl. .................. 74/89.42; 74/441

(58) Field of Classification Search .......... 74/89.42, 74/440, 441, 424.72, 424.78; 267/273, 275, 267/277, 278

See application file for complete search history.

(56) References Cited

U.S. PATENT DOCUMENTS

| 3,124,969 | A | * | 3/1964 | Grabowski | .......... 74/441 |
| 4,009,968 | A | * | 3/1977 | Vandenkieboom | .......... 408/12 |
| 4,433,590 | A | | 2/1984 | Benoit et al. | |
| 5,732,596 | A | | 3/1998 | Erikson et al. | |
| 5,839,321 | A | * | 11/1998 | Siemons | .......... 74/441 |
| 6,142,032 | A | * | 11/2000 | Creager | .......... 74/441 |

FOREIGN PATENT DOCUMENTS

| EP | 0640777 | * | 3/1995 |
| EP | 0878642 | | 11/1998 |
| JP | 1-116369 | | 5/1989 |
| JP | 1116369 | * | 5/1989 |

OTHER PUBLICATIONS

Article by A. Mazzi, "Compensata l'usura con chiocciole in plastica", Organi di Transmissione, Tecniche nuove. Milano, IT, Bd. 30, Nr. Dec. 11, 1999.

* cited by examiner

*Primary Examiner*—Richard Ridley
*Assistant Examiner*—James Pilkington
(74) *Attorney, Agent, or Firm*—Greenblum & Bernstein, P.L.C.

(57) ABSTRACT

Apparatus for screw transmission on a spindle comprising a nut having at least a first and second part with internal threads, at least one bore in the first and second parts, and at least one spring located within the at least one bore of the first and second parts and arranged with a bending load acting crosswise to a longitudinal direction of the bore. The instant abstract is neither intended to define the invention disclosed in this specification nor intended to limit the scope of the invention in any way.

22 Claims, 2 Drawing Sheets

TWO-PART, LOW-BACKLASH SPINDLE NUT

CROSS-REFERENCE TO RELATED APPLICATIONS

The present application claims priority under 35 U.S.C. §119 of Swiss Patent Application No. 01354/04, filed on Aug. 17, 2004, the disclosure of which is expressly incorporated by reference herein in its entirety.

BACKGROUND OF THE INVENTION

1. Field of the Invention

The present invention relates to a two-part, low-backlash spindle nut for a screw transmission with two nut parts equipped with internal threads that interact with the external thread of the spindle of the screw transmission. The two nut parts on the spindle are loaded directed towards one another by at least one spring by torsion.

2. Discussion of Background Information

U.S. Pat. No. 4,433,590 shows a two-part spindle nut including two nut parts provided with internal threads preloaded on the external thread of the spindle by a spring, such that the nut parts are held against one another by a preloaded torque from the spring. The spring is wound on the cylindrical surfaces of the nut parts, whereby the spring wire ends are attached to the nut parts. The installation of this spindle nut entails considerable effort. The spring interferes on the surface of the nut parts requiring a protective cover, which increases the overall costs of the spindle nut. The preloading of the nut parts compensate for any wear of the threads on the spindle nuts and/or on the spindle, so that virtually no backlash occurs on the screw transmission during operation. However, the action of force of the spring will decrease during the life of the screw transmission, because the spring slackens due to stretching caused by thread wear.

SUMMARY OF THE INVENTION

The present invention is to develop a low-backlash spindle nut of the type mentioned at the outset which allows simple manufacture and installation, comprises simple parts, does not change its properties during the life of the screw transmission, is cost-effective and does not have any interfering, projecting parts.

A two-part, low-backlash spindle nut embodied according to the invention includes bodies of the nut parts turned towards one another having with at least two opposed bores arranged in an offset manner. A coil spring contacts holding regions of each of the opposed offset bores. The coil spring is inserted with a bending load acting crosswise to its longitudinal direction. The two-part, low-backlash spindle nut, allows for both nut parts to be manufactured simply with axially parallel bores. Coil springs curved crosswise to their longitudinal direction are inserted into the opposed offset bores lying in the bodies of the nut parts such that simple installation is ensured. The holding region of the bore can be understood as the area of the bore surrounding the end area of the coil spring with low backlash. In particular, the end area of the coil spring is held at the above location, such that the holding region lies in the base region of the bore which generally is formed by a blind-hole bore. Thus, an external cover of the spindle nut is not necessary, since the coil springs are externally protected in the bodies of the nut parts. Moreover, subjecting the coil springs to a bending load crosswise to their longitudinal direction for preloading the nut parts with torsion provides an advantage over the prior art. In particular, the action of force of the coil spring on the two nut parts remains virtually constant over the entire life of the screw transmission. This measure leads to a particularly higher durability of the screw transmission.

An advantage of the instant invention is the structural arrangement of the coil spring having a smaller external diameter in the region of the openings of the bores than the bore itself. In particular, this shaping of the coil spring allows a bending of the coil spring crosswise to its longitudinal direction in the opening region of the bores.

At their openings, the cylindrical bores can be provided with recesses allowing the lateral bending of the coil spring crosswise to its longitudinal direction. In particular, the opening regions of the bores can easily be provided with recesses during manufacture. With the above structural arrangement, the coil spring can advantageously include a cylindrical outer surface in its entire length.

The invention is directed to an apparatus for screw transmission on a spindle comprising a nut having at least a first and second part with internal threads, at least one bore in the first and second parts, and at least one spring located within the at least one bore of the first and second parts and arranged with a bending load acting crosswise to a longitudinal direction of the at least one bore. The spring can be a coil spring having a smaller external diameter in the region of the openings of the bores than the bore itself. Further, the at least one bore may have a bore opening allowing for lateral bending of the spring crosswise to its longitudinal direction. Further still, the spring may include a cylindrical outer surface.

According to another feature of the invention, the nut interacts with an external thread of a spindle. The apparatus can be being formed as a two part, low backlash spindle nut. Further, the spring may be arranged to create a torsional force between the first and second parts.

According to another feature of the invention, the at least one bore of the first and second parts can be arranged opposite each other, and be linear and/or nonlinear. The bore can be a blind bore that flares outwardly toward a bore opening. Further, the bore can be structured to maintain a bending of the at least one spring. Further still, the bore may include at least one step between a bore opening and a bore end. The bore may include a holding region and a bore opening, such that the bore opening is larger in diameter than the holding region. Further, the bore may include a holding region structured and arranged to hold portions of the spring. Further still, the at least one bore of the first and second parts may include bore openings and holding regions arranged opposite each other. The bore openings of the first and second parts can be arranged opposite each other and the holding regions of the first and second parts can be arranged offset from each other.

According to another feature of the invention, the at least one bore comprises a linear portion and a nonlinear portion. Further, the first and second parts can be arranged such that the linear portion of the bore of the first part is arranged opposite the nonlinear portion of the second part, and the linear portion of the second part is arranged opposite the non linear portion of the first part. Further still, the at least one bore of the first and second parts can have a portion with a step and a portion without a step. The first and second parts are arranged such that the step in the first part is arranged opposite the portion without the step in the second part, and the step in the second part is arranged opposite the portion without the step of the first part.

According to another feature of the invention, a first bore holding region diameter is not aligned with a second bore holding region diameter when the first bore opening is aligned with the second bore opening.

The instant invention is directed to a low backlash spindle nut comprising a first part and a second part having internal threads for interaction with an external thread of a spindle, and at least one spring causing a torsional force between the first and second parts. The torsional force rotates the first and second parts to push against one another, and compensates for wear on the internal and external threads.

The instant invention is directed to a low backlash spindle nut comprising a first part and a second part having internal threads to interact with an external thread of a spindle, and at least one bore can be positioned in each of the first and second parts, and at least one spring deflected from a rest state and located within the at least one bore in each of the first and second parts.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
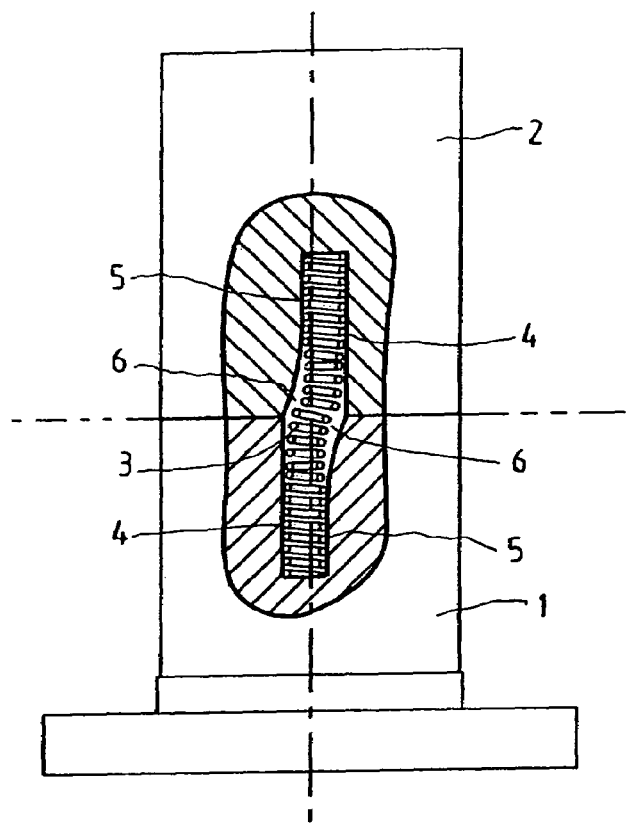
FIG. 1 A spindle nut from the side, partially in section.

FIG. 1 shows a two-part spindle nut partially in section. This spindle nut is composed of two nut parts 1 and 2. The two-part spindle nut is for a screw transmission. The spindle of the screw transmission (not shown) has an external thread, which is known per se. The two nut parts 1 and 2 are equipped with internal threads to interact with the external thread of the spindle (not shown). The two nut parts 1 and 2 are independent units and both can be displaced on the spindle with rotational movements. However, the two nut parts 1 and 2 are not independent of one another and are connected to one another by at least one coil spring 3. The coil springs 3, cause a torsional force between the two nut parts 1 and 2. In this manner, the torsional forces rotate the nut parts 1 and 2 on the spindle to push against one another and, thus compensates for any wear on the threads. This arrangement provides a low-backlash screw transmission.

Figure 3:
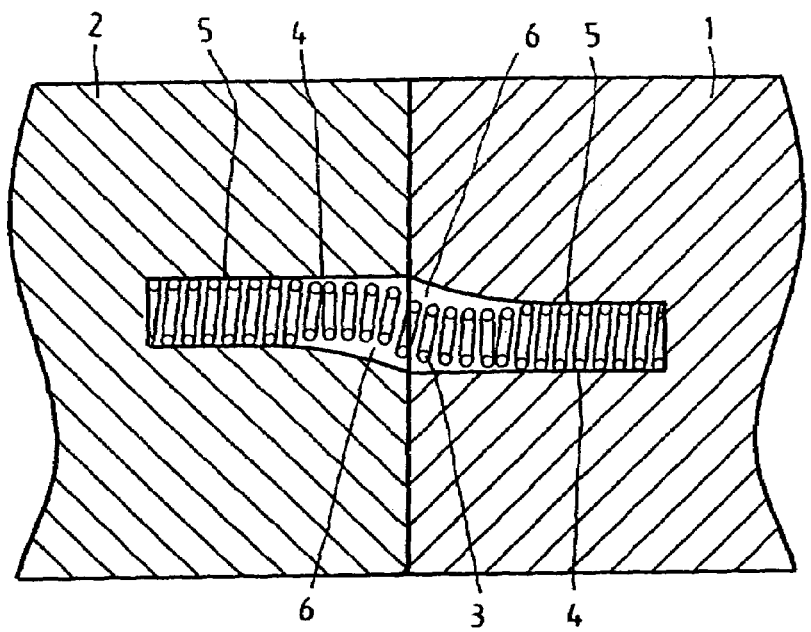
FIG. 3 Partial views of two nut parts in section, as in FIG. 1, but on a larger scale.

FIG. 3 shows an enlarged view of the arrangement shown in FIG. 1. The coil springs 3, as in FIG. 1, are placed in the bores 4 installed opposite one another. The outer ends of the bores 4 have holding regions 5 to hold the coil springs 3 with a negligible play. The coil springs 3 held in the holding regions 5 hold the two nut halves against one another through torsional forces, whereby the coil springs 3 are subjected to a bending load crosswise to their longitudinal direction.

In order to ensure the bending of the coil springs 3 in the opening region in the bores 4 crosswise to the longitudinal direction of the coil springs 3, the outer diameters of the coil springs 3 are smaller than the diameter of the bores 4. Thus, sufficient space is provided for bending the coil springs 3.

Sufficient space for bending the coil springs 3 in the crosswise direction is provided through recesses 6 in the opening areas of the bores 4, such that the coil springs 3 can have a cylindrical outer diameter throughout.

Figure 2:
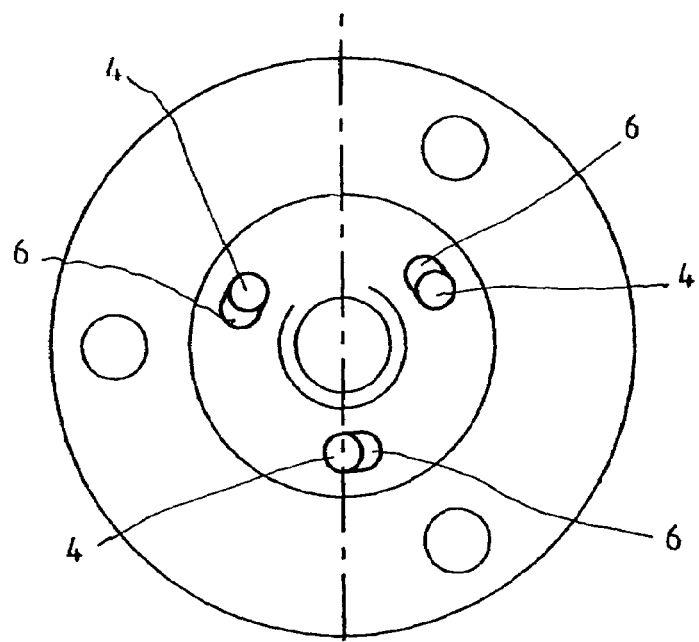
FIG. 2 The plan view of a nut part when the second nut part has been removed.
Figure 4:
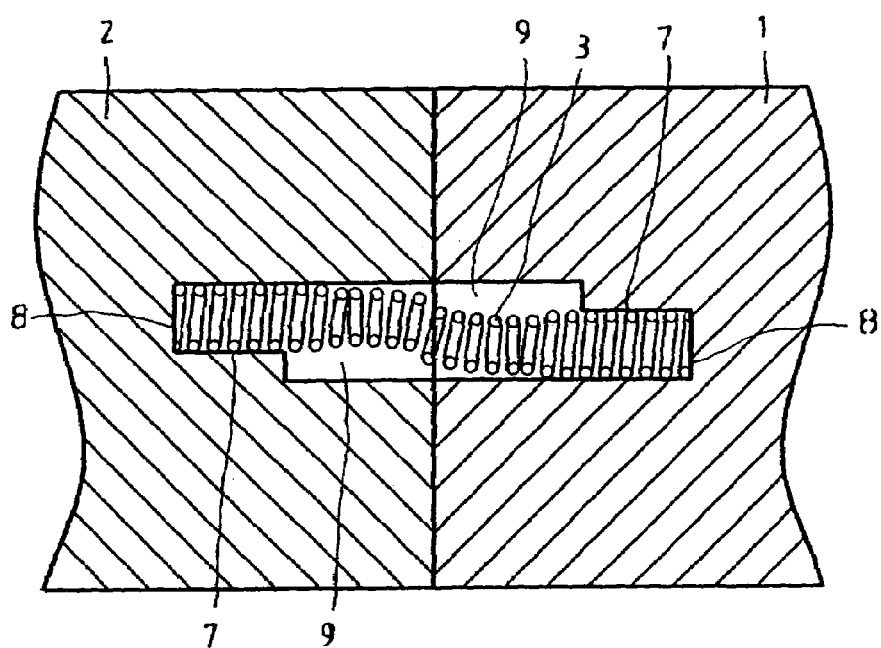
FIG. 4 Partial views of two nut parts in section with pierced opening regions of the bores for the coil spring.

According to another feature of the invention, and in contrast to the arrangement of FIGS. 1-3, in which the opening region of the bore 4 is countersunk on one side. FIG. 4 shows an embodiment of the opening region in which the holding region 7 of the bore 8 is in the base of the bore 8. The opening region is provided with recesses 9 pierced on one side in order to provide sufficient space for the lateral bending of the coil spring 3.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. An apparatus for screw transmission on a spindle, comprising:
    a nut comprising at least a first and second part with internal threads;
    at least one bore in the first part and at least one bore in the second part; and
    at least one spring located within the at least one bores of the first and second parts;
    each at least one bore of the first and second parts comprising a holding region structured and arranged to hold portions of the at least one spring,
    wherein the holding regions of the first and second parts are arranged offset to each other to maintain a bending of the at least one spring to create a torsional force between the first and second parts and wherein the holding region in a respective bore is smaller in diameter than a diameter of a bore opening for the respective bore.

2. The apparatus in accordance with claim 1, wherein the at least one spring is a coil spring.

3. The apparatus in accordance with claim 2, wherein the coil spring features a smaller external diameter in the region of the openings of the bores than the bore itself.

4. The apparatus in accordance with claim 1, wherein at least one of the bores in the first and second part has a bore opening allowing for lateral bending of the at least one spring crosswise to its longitudinal direction.

5. The apparatus in accordance with claim 4, wherein the at least one bore of the first and second parts have a portion with a step and a portion without a step, and
the first and second parts are arranged such that the step in the first part is arranged opposite the portion without the step in the second part, and the step in the second part is arranged opposite the portion without the step of the first part.

6. The apparatus in accordance with claim 4, wherein a first bore holding region diameter is not aligned with a second bore holding region diameter when the first bore opening is aligned with the second bore opening.

7. The apparatus in accordance with claim 1, wherein the at least one spring includes a cylindrical outer surface.

8. The apparatus in accordance with claim 1, wherein the nut interacts with an external thread of a spindle.

9. The apparatus in accordance with claim 1 being formed as a two part, low backlash spindle nut.

10. The apparatus in accordance with claim 1, wherein the at least one bores of the first and second parts have bore openings arranged opposite each other.

11. The apparatus in accordance with claim 1, wherein the at least one bores of the first and second parts have bore openings with a recess pierced on one side.

12. The apparatus in accordance with claim 11, wherein the first and second parts are arranged such that the one side of the bore opening with the recess in one of the first part or the second part is arranged opposite a side of the bore opening without the recess in the other of the first part or the second part.

13. The apparatus in accordance with claim 11, wherein the bore openings of the first and second parts are arranged opposite each other.

14. The apparatus in accordance with claim 1, wherein the at least one bores of the first and second parts are blind bores flaring outwardly to respective bore openings.

15. The apparatus in accordance with claim 14, wherein the respective bore openings of the first and second parts are arranged opposite each other.

16. The apparatus in accordance with claim 1, wherein the at least one bores include at least one step between a bore opening and a respective bore end.

17. The apparatus in accordance with claim 16, wherein the bore openings of the first and second parts are arranged opposite each other.

18. The apparatus in accordance with claim 1, wherein the holding region in a respective bore surrounds end areas of the at least one spring with one of low backlash and negligible play in a base region of the respective bore.

19. The apparatus in accordance with claim 1, wherein the apparatus comprises a low backlash spindle nut, in which the torsional force rotates the first and second parts to push against one another, and compensates for wear on the internal and external threads.

20. The apparatus in accordance with claim 1, wherein the at least one bores of the first and second parts have bore openings countersunk on one side.

21. The apparatus in accordance with claim 20, wherein the first and second parts are arranged such that the one side of the bore opening with the countersunk bore opening in one of the first part or the second part is arranged opposite a side of the bore opening without the countersunk bore opening in the other of the first part or the second part.

22. The apparatus in accordance with claim 20, wherein the bore openings of the first and second parts are arranged opposite each other.

* * * * *